(12) United States Patent
Siddu et al.

(10) Patent No.: US 8,265,367 B2
(45) Date of Patent: Sep. 11, 2012

(54) IDENTIFYING BLOOD VESSELS IN LUNG X-RAY RADIOGRAPHS

(75) Inventors: Dinesh Mysore Siddu, Bangalore (IN); Mausumi Acharyya, Bangalore (IN); Jonathan Stoeckel, Hierden (NL); Sandesh Gupta, Kanpur (IN)

(73) Assignees: Siemens Computer Aided Diagnostics, Ltd., Jerusalem (IL); Siemens Information Systems, Ltd., Bangalore (IN)

( * ) Notice: Subject to any disclaimer, the term of this patent is extended or adjusted under 35 U.S.C. 154(b) by 1039 days.

(21) Appl. No.: 12/132,381

(22) Filed: Jun. 3, 2008

(65) Prior Publication Data

US 2008/0298666 A1    Dec. 4, 2008

Related U.S. Application Data

(60) Provisional application No. 60/941,811, filed on Jun. 4, 2007, provisional application No. 60/941,801, filed on Jun. 4, 2007, provisional application No. 60/941,826, filed on Jun. 4, 2007.

(51) Int. Cl.
G06K 9/00    (2006.01)

(52) U.S. Cl. .......................................... 382/130; 378/62

(58) Field of Classification Search .................. 382/130, 382/128, 131; 378/62, 98
See application file for complete search history.

(56) References Cited

U.S. PATENT DOCUMENTS

| | | | |
|---|---|---|---|
| 5,289,374 A | | 2/1994 | Doi et al. |
| 5,668,888 A | * | 9/1997 | Doi et al. ...................... 382/132 |
| 6,141,437 A | * | 10/2000 | Xu et al. ....................... 382/130 |
| 6,694,046 B2 | | 2/2004 | Doi et al. |
| 7,058,210 B2 | * | 6/2006 | Mundy et al. ................ 382/128 |
| 2005/0100208 A1 | * | 5/2005 | Suzuki et al. ................ 382/157 |
| 2006/0098854 A1 | | 5/2006 | Oosawa |

OTHER PUBLICATIONS

Acharyya et al., "Use of random process-based fractal measure for characterization nodules and suspicious regions in lung", Proceedings of SPIE—The International Society for Optical Engineering, vol. 6915, No. 1, Jan. 1, 2008, pp. 69151F/1-69151F/7.
Chen et al., "Fractal Feature Analysis and Classification in Medical Imaging", IEEE Transactions on Medical Imaging, IEEE Service Center, Piscataway, NJ, vol. 8, No. 2, Jun. 1, 1989, pp. 133-142.
Acharyya et al., "A novel method of partitioning regions in lungs and their usage in feature extraction for reducing false positives", Proceedings of the SPIE, vol. 6915, Mar. 6, 2008, pp. 69150Z/1-69150Z/7.
Samei et al., "Chapter 12: Effects of Anatomical Structure on Signal Detection", Handbook of Medical Imaging, vol. 1, 2000, pp. 654-683.
Park et al., "Detection and labeling ribs on expiration chest radiographs", Proceedings of the SPIE—The International Society for Optical Engineering, SPIE, Bellingham, VA, vol. 5030, Jan. 1, 2003, pp. 1021-1031.
Sanada et al., "Image Feature Analysis and Computer-Aided Diagnosis in Digital Radiography: Automated Delineation of Posterior Ribs in Chest Images", Medical Physics, AIP, Melville, NY, vol. 18, No. 5, Sep. 1, 1991, pp. 964-971.

(Continued)

*Primary Examiner* — Hoon Song
(74) *Attorney, Agent, or Firm* — Peter Withstandley

(57) ABSTRACT

A method of detecting blood vessel shadows in an anterior posterior x-ray radiograph comprising the steps of: generating candidate sub areas of the radiograph showing changes in contrast above a threshold level; supressing rib shadow edges; eliminating lung tissue shadow edges, and categorizing and eliminating nodule shadows.

12 Claims, 5 Drawing Sheets

OTHER PUBLICATIONS

Lo et al., "Extraction of rounded and line objects for the improvement of medical image pattern recognition", Nuclear Science Symposium and Medical Imaging Conference, 1994, 19991 IEEE Conference Record, Norfolk, VA Oct. 30-Nov. 5, 1994, New York, NY, IEEE, vol. 4, pp. 1802-1806.

International Search Report including Notification of Transmittal of the International Search Report, International Search Report, and Written Opinion of the International Searching Authority.

* cited by examiner

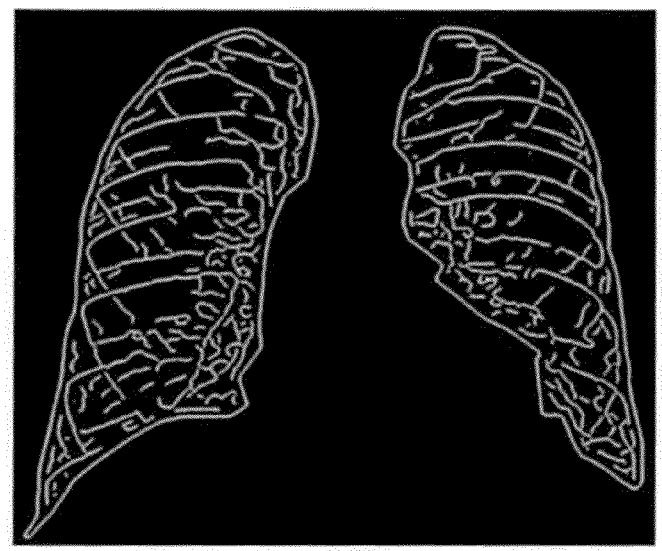
Fig. 4
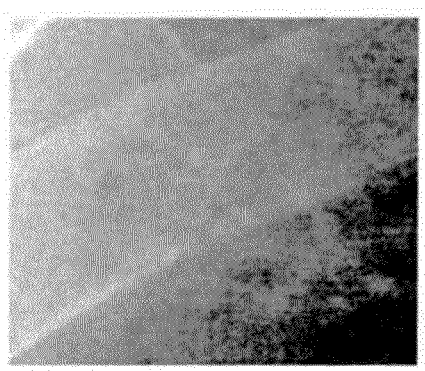 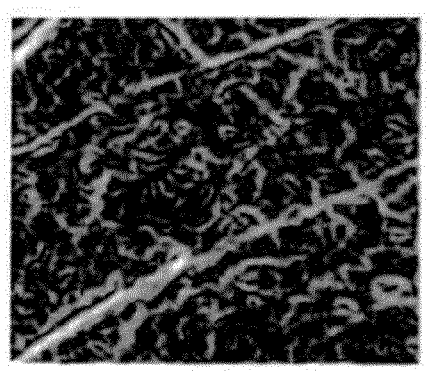
Fig. 5 Fig. 6
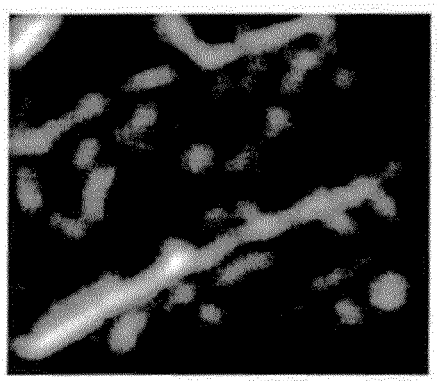 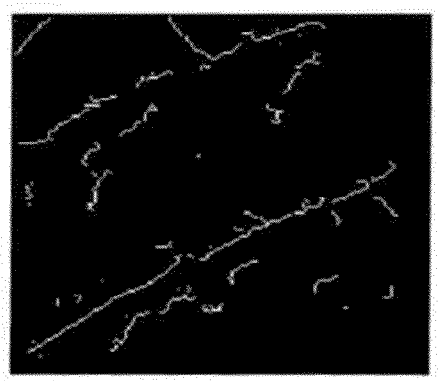
Fig. 7 Fig. 8

IDENTIFYING BLOOD VESSELS IN LUNG X-RAY RADIOGRAPHS

CROSS REFERENCE TO RELATED APPLICATION

The present application claims priority rights from U.S. Provisional Application No. 60/941,811, filed Jun. 4, 2007; U.S. Provisional Application No. 60/941,826, filed Jun. 4, 2007; and U.S. Provisional Application No.60/941,801, filed Jun. 4, 2007.

FIELD OF THE INVENTION

The present invention relates to computer aided diagnosis (CAD), and particularly to imaging the thoracic cavity for lung examination purposes, specifically to identify blood vessels therein.

BACKGROUND TO THE INVENTION

The chest x-ray is the most commonly performed diagnostic x-ray examination. The heart, lungs, airway, blood vessels and the bones of the spine and chest are imaged in a painless medical test that helps in the diagnosis of medical conditions.

The chest x-ray is typically the first imaging test used to help diagnose causes of symptoms such as shortness of breath, fever, a bad or persistent cough, chest pain or injury. Its application helps in diagnosing and monitoring treatment for medical conditions such as pneumonia, lung cancer, emphysema and heart failure and other heart problems. It may be used to find fractures in ribs as well.

Pneumonia shows up on radiographs as patches and irregular whiter areas, indicative of higher x-ray absorption from fluid in the lungs. If the bronchi, which are usually not visible, can be seen, a diagnosis of bronchial pneumonia may be made. Shifts or shadows in the region corresponding to the hila (the central mediastinal surfaces of the lungs where the lung roots enter) may indicate emphysema or a pulmonary abscess. Apparent widening of the spaces between ribs suggests emphysema. Other pulmonary diseases may also be detected or suspected through chest x-ray examination.

Lung cancer usually shows up as some sort of abnormality on the chest radiograph. Hilar masses (enlargements at that part of the lungs where vessels and nerves enter) are one of the more common symptoms as are abnormal masses and fluid buildup on the outside surface of the lungs or surrounding areas. Interstitial lung disease, which is a large category of disorders, many of which are related to exposure of substances (such as asbestos fibers), may be detected on a chest x-ray as fiber like deposits, often in the lower portions of the lungs.

The lungs are situated within the rib cage. Because bones absorb x-rays to a larger extent than soft tissues, these appear as white stripes across the x-ray radiograph. The ribs curl around the body and consequently the rib shadow on the x-ray radiograph appear to cross each other. The cross-over points and the regions between the cross-over points appear as a pattern of almost parallelogram-like shapes. This pattern may disguise the shadows cast by nodules which may be aligned with the crossover points, with the spaces therebetween, with a single rib between the cross-over points, and frequently overlap two or three of these regions.

In addition to the rib cage, the blood vessels within the lung have higher density than the air filled spongy lung tissue and absorb more x-rays, thereby causing them to cast a shadow, i.e. appear lighter on the radiograph. The lungs themselves have edges and absorb more x-rays than the space in the thoracic cavity therearound.

Absolute absorption varies with the period of exposure, the strength of the x-ray source and the size of the patient. Details are resolved by contrast between regions, and thus CAD programs seek out and identify edges.

Although supposed to keep still and hold their breadth, keeping lungs inflated, patients may move or inhale or exhale during the exposure to x-rays, blurring the resultant radiography image somewhat. Since x-ray radiation may itself cause malignancies, radiologists are wary of repeatedly exposing patients to x-rays, particularly with pregnant women, the young, the elderly and/or the ill. With some systems, such as those using traditional film, it may be impossible to repeat the test once a problem is determined, as the patient is no longer available.

Lung cancer may manifest itself as one or more malignant nodule which is typically near-spherical and shows up as a near-circular whiter region on the lung tissue. The size of the nodule may be smaller, similar or larger than the rib cross-over, and thus isolation and identification of nodules is not easy.

It is, of course, imperative to detect all resolvable nodules. To avoid unnecessary anxiety and to reduce costs of unnecessary biopsies; it is desirable to minimize false positives as well.

The skilled radiographer may manually pick out nodules, but to speed up the diagnostic procedure, Computer Aided Diagnostic (CAD) techniques are increasingly used.

One approach used is segmentation, where the borders of features such as the lung lobe itself and ribs are identified. This is not always possible and indeed, is not always necessary.

What is required is to identify candidate regions of interest and to then decide if they are nodules or false positives. Once identified as a nodule, it is then necessary to determine if it is benign or malignant. This may require a biopsy, but can sometimes be determined by monitoring the nodule over time.

'False negatives' where actual nodules or tumors are not identified as such or discarded as 'noise' or some artifact of the system are unacceptable. The occurrence of 'false positives' where some other feature such as a rib crossing shadow is mistakenly identified as being attributed to a tumor, should be minimized. In practice the elimination of false positives whilst avoiding false negatives is difficult since tumors may have similar dimensions to the width of ribs or the diameter of blood vessels within the lung, and x-ray images typically have poor contrast. When scanning the lung region of posterior anterior x-ray images to look for regions of varying contrast or edges, a large number of candidate regions turn out to be rib crossings and the like.

There is a need to provide alternative approaches and methods to computer aided diagnostics for examining chest x-rays and the present invention addresses this need.

SUMMARY OF THE INVENTION

Embodiments of the present invention are directed to analyzing lung radiographs to differentiate between blood vessels and nodules, training classifiers, extracting features relating to blood vessels In a first aspect, the present invention is directed to providing a method of detecting blood vessels in an anterior posterior x-ray radiograph comprising the steps of:

suppressing rib shadows;
identifying short pieces of edges as indicative of lung tissue shadow edges, and
differentiating between nodule edges and blood vessel edges.

Preferably, the step of identifying lung tissue edges comprises identifying short lengths of edges as being lung tissue edge related.

Typically, the short lengths of edges relating to lung tissue comprise not more than 20 adjacent pixels, or even 10 adjacent pixels.

In one approach, the step of differentiating between nodule edges and blood vessel edges comprises segmenting lungs into a vessel region having an upper limit at knuckle point on left lung and a lower limit at cardiac notch and weighting candidates within the vessel region as being likely blood vessel candidates by virtue of their location.

In another approach, which may be complimentary or independent of the previous approach, edges within candidate regions of a post rib suppression image are identified as being part of closed loops and major and minor axes of said closed loops are calculated, such that a significant eccentricity of the closed loops as indicated by relative sizes of major and minor axes indicates likelihood of closed loop being edge of a blood vessel shadow, whereas an insignificant eccentricity of the closed loops is indicative of the closed loop being a nodule shadow.

A second aspect of the invention is directed to providing a method of characterizing blood vessel shadows in a sub image of an anterior posterior chest radiograph comprising the step of identifying and suppressing rib edges; defining a vessel region having an upper limit at knuckle point of left lung and a lower limit at cardiac notch and weighting edges within the vessel region as being likely blood vessel candidates by virtue of their location.

Typically, the method comprises identifying edges within candidate regions of a post rib edge suppression image as being part of closed loops and calculating major and minor axes of said closed loops, such that eccentricity of the closed loops as indicated by relative sizes of major and minor axes thereof indicates likelihood of closed loop being edge of a blood vessel shadow.

Optionally the method comprises discounting possibility of an edge in region corresponding to either left or right lung lobe that is above knuckle point or below cardiac notch being related to a blood vessel.

Optionally the method comprises defining a feature indicative of an edge belonging to a blood vessel being the inverse of distance from cardiac notch.

A further aspect is directed to a method of detecting blood vessel shadows in an anterior posterior x-ray radiograph comprising the steps of:
a. generating candidate sub areas of the radiograph showing changes in contrast above a threshold level
b. suppressing rib shadow edges;
c. eliminating lung tissue shadow edges, and
d. categorizing and eliminating nodule shadows.

BRIEF DESCRIPTION OF THE FIGURES

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

FIG. 4 shows the lungs of FIG. 3 after extracting edges;

FIG. 5 is a sub image of the lung, i.e. a region of the lung image, perhaps selected by a moving window technique as including a candidate nodule;

FIG. 6 is a magnitude image of the image of FIG. 5, showing spurious edges;

FIG. 7 is a processed image created from the magnitude image of FIG. 5 after applying the Otsu method and suppressing the lower magnitude values;

FIG. 8 is a black and white image corresponding to FIG. 7 after a non-maximum suppression and hysteresis threshold;

DESCRIPTION OF THE EMBODIMENTS

The shadows of blood vessels and ribs in posterior anterior x-ray radiography images of the chest obscure nodules, making them difficult to identify.

Embodiments of the present invention are directed to detecting, identifying and correctly characterizing physiological features, particularly ribs and blood vessels which show up in x-ray radiographs, obscuring nodules and other irregularities of interest. Applications include training classifiers, improved CAD systems and faster more accurate diagnostics.

An edge detection scheme is employed. When looking for nodules and the like, by attributing edges appearing in posterior anterior x-ray images to ribs, blood vessels or edges of the lungs themselves, these may be discounted. Non-discounted edges are more likely to be nodules requiring further consideration. In this manner, the ratio of nodules to false positives is maximized and the effectiveness of CAD image analysis is improved.

Correct identification of candidates as being shadows cast by ribs, rib crossover points or blood vessels, enables the creation and build up of classification libraries. The effectiveness of systems including artificial intelligence algorithms, such as neural networks, may be optimized by correct identification and detection of such elements.

Figure 1:
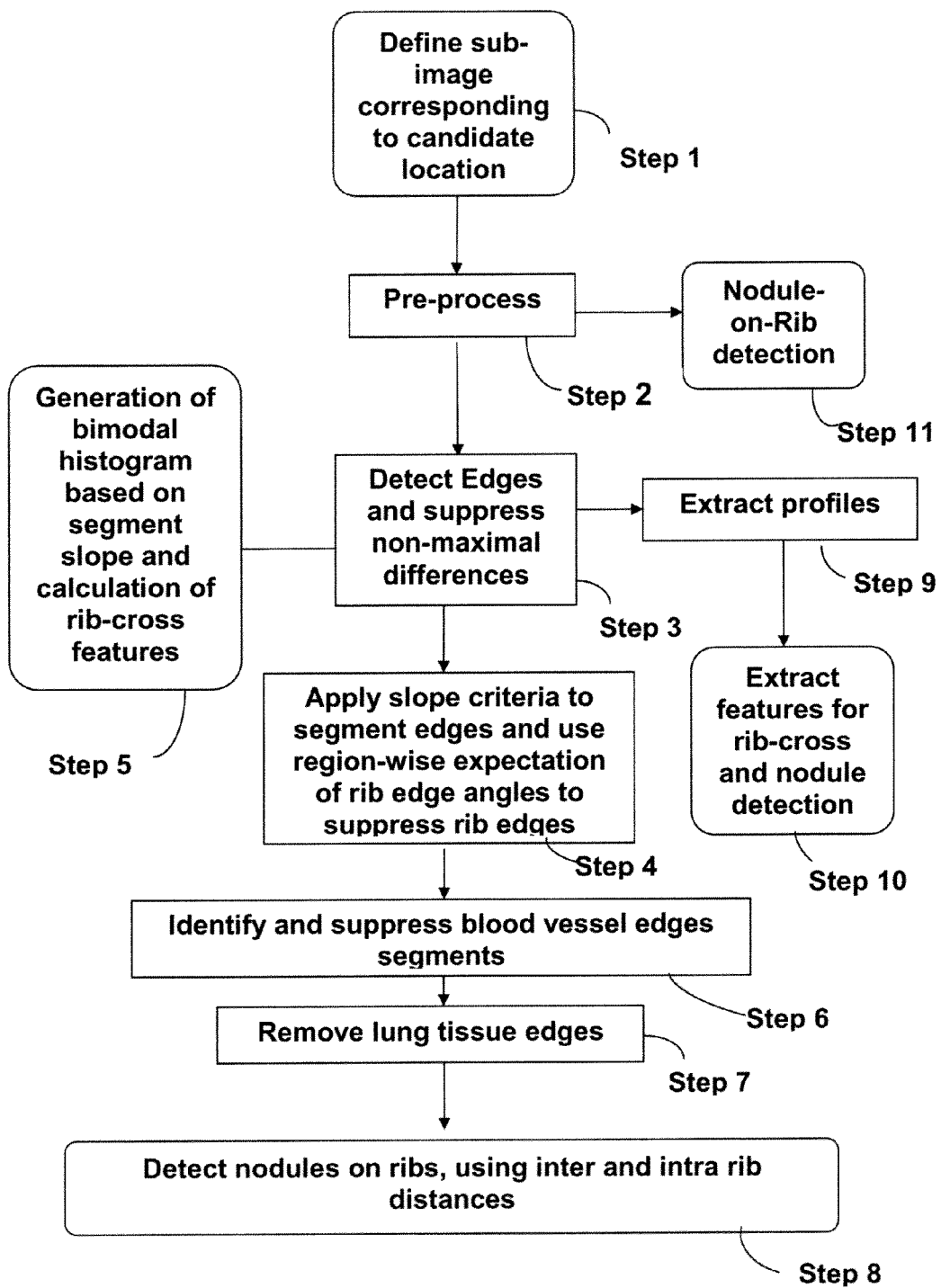
FIG. 1 is a flowchart presenting an overview of a methodology for analyzing chest x-ray images in accordance with one embodiment of the invention.

With reference to FIG. 1 an overview of this novel approach is presented.

Figure 2:
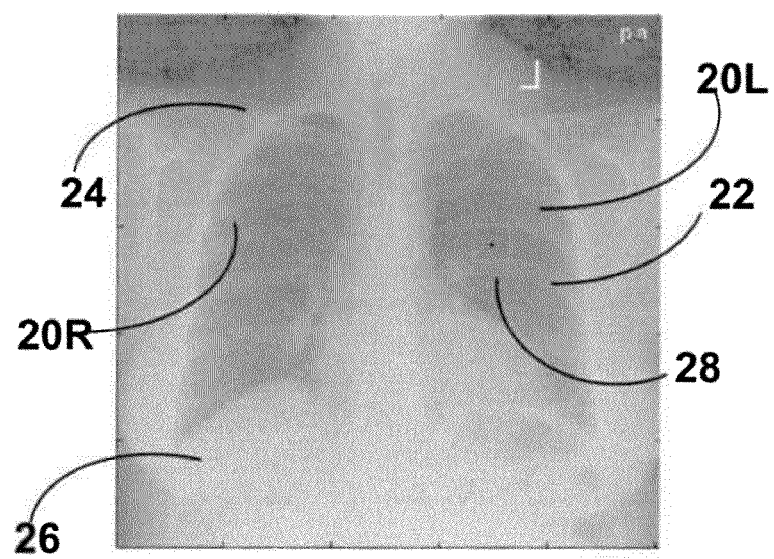
FIG. 2 is a typical, though high quality, anterior-posterior chest x-ray of a female patient.
Figure 10:
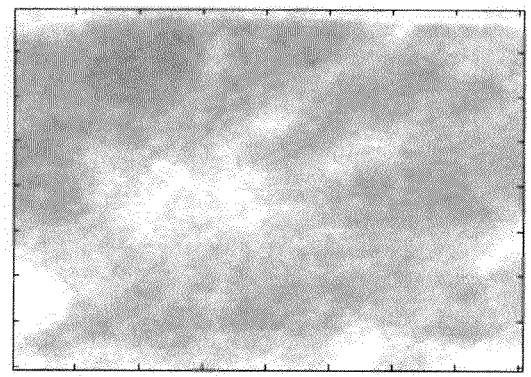
FIG. 10 shows the candidate sub image of FIG. 2 after edge extraction making it much easier to identify non rib related shadows.

Firstly, a sub-image corresponding to a candidate location is defined (step 1). In FIG. 2 such a candidate 28 is shown. The sub image is shown in FIG. 10 in more detail. The candidate location is preprocessed (step 2)—FIG. 12. The purpose of preprocessing is to enhance the contrast, to suppress spurious noise, and to extract intensity information. Edges within the sub image are detected (step 3) shown in FIG. 13, by defining contrast thresholds, such that lesser contrasting regions are suppressed. Next, a slope criterion is applied to identify edges corresponding to ribs and non ribs (step 4). A bimodal histogram may be used to differentiate between single rib and rib crosses and to thus identify rib cross features (step 5). By identifying and suppressing edges corresponding to rib edges, edges corresponding to blood vessels may be detected (step 6). Remaining, short pieces of edge fragment, typically no more than say, 10 pixels long, may be attributed as relating to the lung tissue itself (step 7). Having identified lung tissue edges, edges of blood vessels and rib edges and suppressed these, only edges not conforming to any of the above are left. Such edges may relate to nodules, inhaled objects, pneumonia and other features of interest. Remaining edges may now be examined (step 9) without disruptive influence of other edges. Typically nodules are more or less spherical, and thus the existence of a circular edge is likely a nodule.

Rib edges, once positively identified as such may be suppressed to help detect and examine additional features. By looking at distances of apparent edges from clearly identified rib edges, and comparing to the inter rib and intra rib distances, the apparent edges can be identified as being or not being edges of adjacent ribs or opposite edges of the same rib, and positively identified as due to some other feature (step 8). In general, therefore, it is possible to identify the profiles of structures in the radiography image (step 9) and to determine features (step 10) that can be subsequently used by classifiers to classify structures as being due to ribs, rib crosses, lung tissue edges, blood vessels or nodules.

Edge Extraction

FIG. 2 is a typical posterior anterior x-ray radiograph of the chest of a female patient showing left 20L and right 20R lungs. These are, however, partially obscured by the shadow cast by the denser bone tissue of the ribs 22, the clavicle 24, and by the breast tissue 26. A candidate of interest 28 is shown.

Figure 3:
FIG. 3 shows the lungs after running a segmentation algorithm to show the lung region only.

FIG. 3 shows the lungs after running a segmentation algorithm of the prior art, such as that described in US20070127802A1 to Odry et al. titled "Method and System for Automatic Lung Segmentation", for example. The left and right lung shadows are partially obscured by rib shadows with several rib shadows shown. These appear as stripes across the image of the lung. The rib cage effectively curves around the lungs, and thus the shadows cast by the rib sections behind and in front of the lungs appear to cross each other. Shadows from other tissues are also seen. Some may be attributed to blood vessels or to healthy lung tissue. Others are cause for concern, being symptomatic of nodules and other tumors, fluid build up (pneumonia) and other undesirable causes. It is difficult and time consuming to analyze lung radiographs and to identify areas of interest.

To analyze the image, edge extraction is performed. This provides a corresponding image showing the edges only, as shown in FIG. 4.

Edge detection (FIG. 1 step 3) may use a modification of the Canny edge detector [H. Takeshi, F. Hiroshi and X. Jing, "Development of automated detection system for lung nodules in chest radiograms" IEEE Trans. on medical imaging 1. p.p. 71-74, 1997], for example.

The sub-steps of one possible edge detection process are:

(3*a*) Smoothing image f(x,y) with a Gaussian filter to reduce noise and unwanted details and textures:

$$f(x, y) \otimes (x, y)\sigma g(x, y) = G$$

Where $$e^{-\left[\frac{x^2+y^2}{2\sigma^2}\right]} \frac{1}{\sqrt{2\pi\sigma^2}}(x, y) = \sigma G$$

(3*b*) calculating the magnitude of gradient image mag(x,y) as:

$$\left|\frac{\partial g}{\partial x} + \frac{\partial g}{\partial y}\right| mag(x, y) =$$

With reference to a specific sub-image of interest—FIG. 5, the magnitude of gradient image thus obtained is shown in FIG. 6. Since contrast is enhanced, real edges are highlighted, but spurious edges may be created.

(3*c*) calculating a threshold value, perhaps using the Otsu thresholding technique [N. Otsu, "A threshold selection method from gray level histograms", IEEE Trans. Systems, Man and Cybernetics, 1979, vol. 9, p.p. 62-66], and the threshold value is used to suppress the lower magnitude values by background suppression—see FIG. 7—and non-maximum suppression followed by application of a hysteresis threshold. In this manner, a black and white image showing edges is generated—see FIG. 8.

Figure 9:
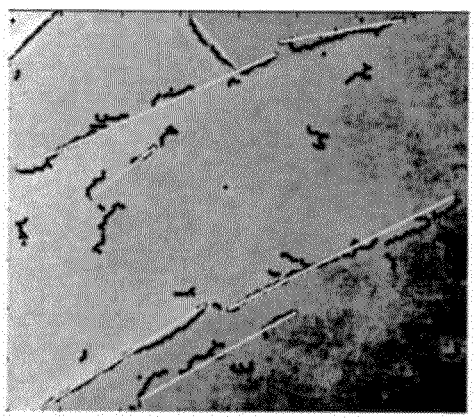
FIG. 9 shows how rib edges can be identified and line segments fitted therealong, to remove these from further consideration.

Edge linking and line segment fitting are now used to draw lines corresponding to the edges shown (FIG. 9), which may be variously attributed to the lung mass itself, to ribs, to blood vessel edges or to nodules.

Due to their straightness, characteristic slope, their coming in parallel, etc. it is possible to identify and suppress rib related phenomena. Once identified and suppressed, what remains should be nodule related. Unfortunately, it will be appreciated that blood vessels and blood vessel edges are similar to nodules in size and general shape and, to minimize false positive identifications, it is imperative to determine blood vessel specific features and nodule specific features to train classifiers and to enable differentiation therebetween.

Identification of Blood Vessels

The lung tissue is a spongy mass with a large number of alveoli serving as an extensive surface for oxygenation. There are three branching systems of passageways running through the blood vessels. The first, bronchi (airways), connect the trachea to the alveoli and allow inhalation of fresh air and expiration of deoxygenated air. The second system is a branching structure of pulsing arteries that is fed by the pulmonary artery which carries deoxygenated blood from the heart to the lungs. The pulmonary artery branches into small diameter blood vessels that enter each lung lobe, and these, in turn, branch down to capillaries which feed deoxygenated blood to the alveoli in the lung tissue, where the blood is oxygenated. The oxygenated blood flows via a system of veins that connect to the pulmonary vein and to the heart.

The airways are difficult to resolve by currently available x-ray techniques, since being air filled, they do not absorb x-rays, and their displacement of regular lung tissue when the whole chest region is imaged, is negligible. Blood vessels, being blood filled rather than air and blood filled, do have higher x-ray absorbance however, and may show up as shadow on the radiograph. The major blood vessels such as the pulmonary artery and vein will generally be resolved, but the smaller vessels will not generally show up. It will be appreciated that lung size and shape vary to some extent from person to person. Indeed, the x-ray image of lungs of the same person will vary with degree of dilation, pneumonia causing mucus accumulation and the like. Nevertheless, the basic branching system is similar, with the diameter of blood vessels dropping as they move outwards towards the extremities of the lungs. The top and bottom edges of blood vessels flowing perpendicular to the imaging direction should appear as parallel tracks, but it is unlikely that these will be resolved as the depth of blood therein is negligible and the thickness of the blood vessel wall tends to a minimum. In contrast, a blood vessel lying in the posterior anterior direction will appear circular, as effectively a cylinder is imaged end on. Such a blood vessel resembles a nodule of the type that is actively sought out in lung examinations for cancer and the like. Most blood vessels will lie at an intermediate angle and appear as poorly resolved ellipses.

Figure 11:
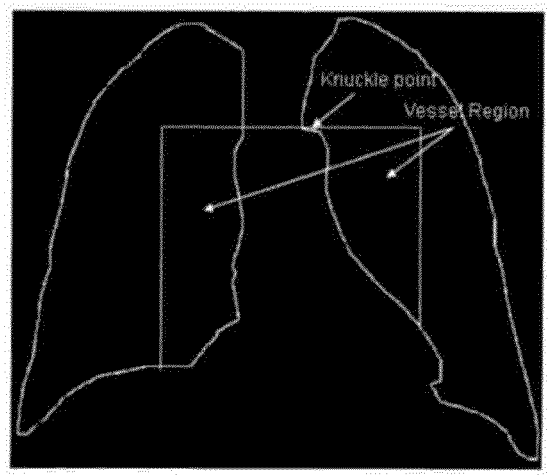
FIG. 11 is an image of segmented lungs showing the knuckle point and cardiac point, and showing a vessel region, wherein blood vessels large enough to be resolvable by standard chest x-ray radiography techniques tend to be situated.

The highest density of x-ray resolvable blood vessels lies at the lower inner regions of the lungs, nearest to the heart. With reference to FIG. 11, a vessel region may be defined extending from the knuckle point on the left lung, down to the cardiac notch of the lung node, extending outwards to about half way across the lungs.

Once rib related artifacts are eliminated from the chest x-ray by the procedure described above with reference to Step 4, blood vessels may be identified by three features: (i) their size, (ii) their shape—specifically the less circular and more elliptical the appearance, the more likely that the cause is a cylindrical blood vessel than a spherical nodule, with the eccentricity of a closed loop ellipse representing its deviation from circularity and (iii) the position of blood vessels in the lung in relation to a reference point, and for this purpose the knuckle point, i.e. the arch of the aorta is conveniently used. In one embodiment, the distance from the heart is used as a weighting factor. Conveniently, the vessel region shown in FIG. 11 is used.

Figure 12:
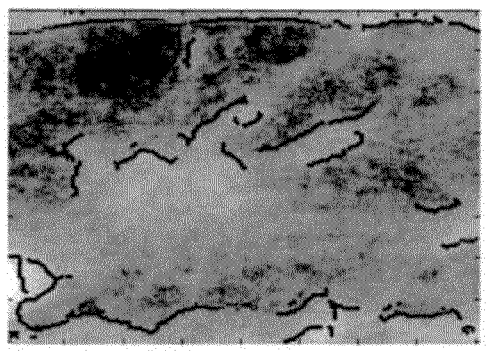
FIG. 12 shows the candidate sub image of FIG. 10 after edge enhancement.
Figure 13:
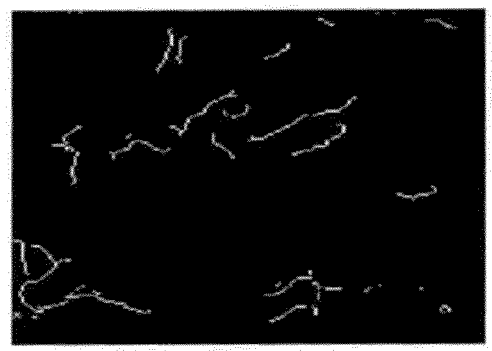
FIG. 13 is a black and white (binary) image corresponding to FIG. 12, showing extracted edges thereof.

As shown in FIG. 12, after edge enhancement and FIG. 13 which is a black and white image obtained by setting thresholds to identify edges, the candidate sub image of FIG. 10 does not appear to be nodule related, since there is an absence of circularity. It is hypothesized that the edges shown relate to blood vessels, perhaps from branching vessels.

In general, using the edge detection procedures described hereinabove, for candidates of interest, simplified images corresponding to edges may be obtained. By analyzing the shape of edges detected, edges may be identified as corresponding to ribs, lung mass or nodules. After removing such detected edges from an edge mapping of a lung image, the resultant edge image will essentially show edges corresponding to blood vessels only. Additional blood vessel features characterizing blood vessels, such as contrast for example, may be computed from these edges. Such blood vessel features may be incorporated within a classifier to help an integrated CAD system to reduce number of false positives due to blood vessels.

By recognizing artifacts appearing in the x-ray radiograph image as being shadows cast by blood vessels, i.e. by discounting shadows cast by lung tissue edges using criteria discussed hereinbelow; shadows cast by ribs for reasons explained above and shadows cast by nodules using features indicative of nodules, the blood vessels thus identified may be used to teach and improve CAD systems that include some self-teaching algorithms such as neural networks or the like.

Various features characteristic of the blood vessels may be extracted, and the information thus obtained used to help identify shadows relating to blood vessels in other images.

For example, the length of the blood vessel edges may be calculated and the edges with the two maximum lengths may be selected.

Referring to these maximum lengths as maxln1 and maxln2, one feature $f_1$ having application to classifiers, etc. may be defined as follows: $f_1 = (\text{maxln1} \times \text{maxln2})/hw$ where h and w are the height and width of the sub image, respectively.

A second feature $f_2$ may be calculated by the minimum distance (min_dist) of each edge from the center point of the lung, where $f_2$ is defined as the inverse of the minimum value (minval) of the minimum distances (min_dist), i.e. 1/minval.

Identification of Nodules

By default, having identified and attributed edges as being borders of ribs, lung tissue or blood vessels, unclassified edge, particularly circular candidates, are likely to be nodules. It will be appreciated that blood vessels running in the general posterior anterior direction may spuriously be identified as being nodules, and, one feature of the present approach, is based on the fact that the density of blood vessels, their size and general orientation varies in a fairly consistent and predictable manner.

Figure 14:
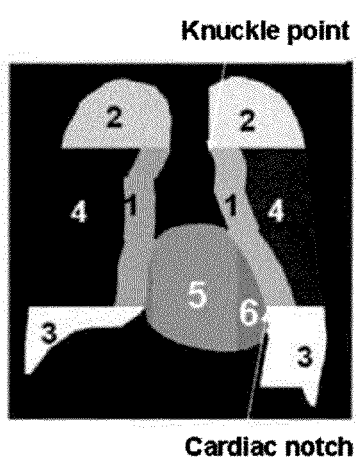
FIG. 14 is a map of the lungs showing how each lung can be conceptually divided into 4 distinct regions.

With reference to FIG. 14, the left and right lung lobes can each be conveniently partitioned into four regions: inner 1, upper 2, lower 3 and outer 4 regions, with the inner region 1 being the resolvable blood vessels. With current technology, it is only the vessel region that is likely to have resolvable blood vessels that could be confused with nodules.

Thus by segmenting lungs into a vessel region having an upper limit at the knuckle point on left lung and a lower limit at the cardiac notch, a bias may be used to weight candidates within the vessel region as being likely blood vessel candidates by virtue of their location.

Edges Corresponding to Lung Tissue

Apart from edges appearing in the inner region 1, resolvable edges of shadows of the lung tissue itself tend to be less than 10 pixels long. Shorter strings can be eliminated from sub regions of interest.

Thus a new approach to CAD analysis of chest x-ray images is presented. A moving window approach is used to identify candidate regions and rib related features are identified and suppressed. Non rib related edges are attributed to lung tissue, blood vessel edges and nodules. The approach to identifying rib edges and blood vessel edges are both believed to be new. By identifying and suppressing or discounting these features, improved computer automated diagnosis of blood nodules is possible. The technique may be combined with other CAD algorithms to improve CAD systems in terms of accuracy of diagnosis and/or reduction of false positives and/or higher throughput. It may be used to supplement or be supplemented by human diagnosis by radiographers and used with other imaging and/or diagnostic techniques.

Experimental Validation

With reference to FIG. 2, an anterior posterior x-ray showing a selected candidate region for further study is shown. FIG. 10 shows the selected candidate region in more detail. Clearly something is there, but it is not clear whether blood vessels or nodules are shown, or whether edges could be rib sections.

By following the methodology explained hereinabove and summarized in FIG. 1, the edges therein are extracted, giving FIG. 12, and a black and white edge image—FIG. 13 is derived.

There is nothing that can be considered as being circular, so the edges shown are not nodule related, but rather relate to blood vessels. The location rules out rib edges due to angles of the edges being outside the characteristic range for ribs in the specific location, and the region is within the vessel region identified in FIGS. 11 and 14 so a high density of blood vessels is expected. By not being attributed to nodules or ribs, it is hypothesized that the image is the result of two branching and partially superimposed forks of blood vessels.

It will be noted that the method of FIG. 1 could be varied by performing some of the steps in a different order. The various sub-routines described for extracting rib related features and for identifying rib edges could be used independently, for example in an edge classifier. Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A method of detecting blood vessels in an anterior posterior x-ray radiograph comprising the steps of:
   a. identifying and suppressing, by a computer, rib shadows in the radiograph;
   b. identifying and suppressing, by the computer, short pieces of edges in the radiograph as indicative of lung tissue shadow edges; and
   c. differentiating, by the computer, between nodule edges and blood vessel edges in the radiograph in which the rib shadows and the short pieces of edges are suppressed; wherein the step of differentiating between nodule edges and blood vessel edges comprises segmenting lungs into a vassel region having an upper limit at knuckle point on left lung an a lower limit at cardiac notch and weighting candidates within the vessel region as being likely blood vessel candidates based on the candidates' locations.

2. The method of claim 1 wherein the step b of identifying lung tissue shadow edges comprises identifying short lengths of edges as being lung tissue edge related.

3. The method of claim 2 wherein the short lengths of edges comprise not more than 20 adjacent pixels.

4. The method of claim 2 wherein the short lengths of edges comprise not more than 10 adjacent pixels.

5. The method of claim 1 further comprises extracting one or more features from the differentiated blood vessel edges and training a classifier with the one or more features for blood vessel detection.

6. a method of detecting blood vessels in an anterior posterior x-ray radiograph comprising the step of:
   a. identifying and supressing, by a computer, rib shadows in the radiograph;
   b. identifying and supressing, by the computer, short pieces of edges in the radiograph as indicative of lung tissue shadow edges; and
   c. differentiating, by the computer, between nodule edges and blood vessel edges in the radiograph in which the rib shadows and the short pieces of edges are suppressed;
   identifying edges within candidate regions of a post rib suppression image as being part of closed loops and calculating major and minor axes of said closed loops, such that a significant eccentricity of the closed loops as indicated by relative sizes of major and minor axes indicates likelihood of closed loop being edge of a blood vessel shadow, whereas an insignificant eccentricity of the closed loops is indicative of the closed loop being a nodule shadow.

7. A method of characterizing blood vessel shadows in a sub image of an anterior posterior chest radiograph comprising:
   identifying and suppressing, by a computer, rib edges in the radiograph;
   defining, by the computer, a vessel region in the radiograph having an upper limit at a knuckle point on left lung and a lower limit at cardiac notch; and
   weighting, by the computer, edges within the vessel region as being likely blood vessel candidates based on the edges' locations.

8. The method of characterizing blood vessels of claim 7 comprising identifying edges within candidate regions of a post rib edge suppression image as being part of closed loops and calculating major and minor axes of said closed loops, such that eccentricity of the closed loops as indicated by relative sizes of major and minor axes thereof indicates likelihood of closed loop being edge of a blood vessel shadow.

9. The method of claim 8 comprising discounting possibility of an edge in region corresponding to either left or right lung lobe that is above knuckle point or below cardiac notch being related to a blood vessel.

10. The method of claim 8 comprising defining a feature indicative of an edge belonging to a blood vessel being the inverse of distance from cardiac notch.

11. The method of claim 7 wherein the step of identifying and suppressing the rib edges comprises applying a slope criterior to identify the rib edges in the radiograph.

12. The method of claim 7 further comprises extracting one or more features from the blood vessel candidates and training a classifier with the one or more features for blood vessel detection.

* * * * *